United States Patent [19]

Rehrig

[11] Patent Number: 4,650,199
[45] Date of Patent: Mar. 17, 1987

[54] BOTTOM-SUPPORTED BASKET

[76] Inventor: B. Houston Rehrig, 4539 Gorham St., Corona Del Mar, Calif. 92625

[21] Appl. No.: 607,129

[22] Filed: May 4, 1984

[51] Int. Cl.$^4$ .............................................. B62B 3/02
[52] U.S. Cl. ..................... 280/33.99 S; 280/DIG. 4; D34/21
[58] Field of Search ................ 280/33.99 R, 33.99 C, 280/33.99 F, 33.99 S, DIG. 4, 33.99 H, 33.99 B, 33.99 A; D34/17, 21; 220/306, 307; 190/18 R, 18 A, 100

[56] References Cited

U.S. PATENT DOCUMENTS

| | | | |
|---|---|---|---|
| 2,918,741 | 12/1959 | Welter et al. | 280/33.99 A |
| 3,147,021 | 9/1964 | Lachance | 280/33.99 F |
| 3,361,438 | 1/1968 | Davis | 280/33.99 R |
| 3,528,583 | 9/1970 | Taylor | 220/306 |
| 3,645,554 | 2/1972 | Von Stein et al. | 280/33.99 R |
| 3,844,557 | 10/1974 | Wahl | 280/33.99 R |
| 3,999,774 | 12/1976 | Rehrig | 280/33.99 R |
| 4,046,394 | 9/1977 | Thompson, Jr. | 280/33.99 R |
| 4,268,049 | 5/1981 | Salvador | 280/33.99 H |

Primary Examiner—David M. Mitchell
Assistant Examiner—Eric D. Culbreth
Attorney, Agent, or Firm—Banner, Birch, McKie & Beckett

[57] ABSTRACT

A bottom-supported plastic basket for use with a wheeled cart frame having an upwardly facing frame mounting portion. The two sides, the front and the bottom of the basket are integrally molded. The bottom portion of the basket includes a plurality of quick release locking features which permit the basket to be readily coupled and decoupled from a cart chassis having corresponding mounting features. The basket may also be coupled to a conventional cart chassis.

15 Claims, 22 Drawing Figures

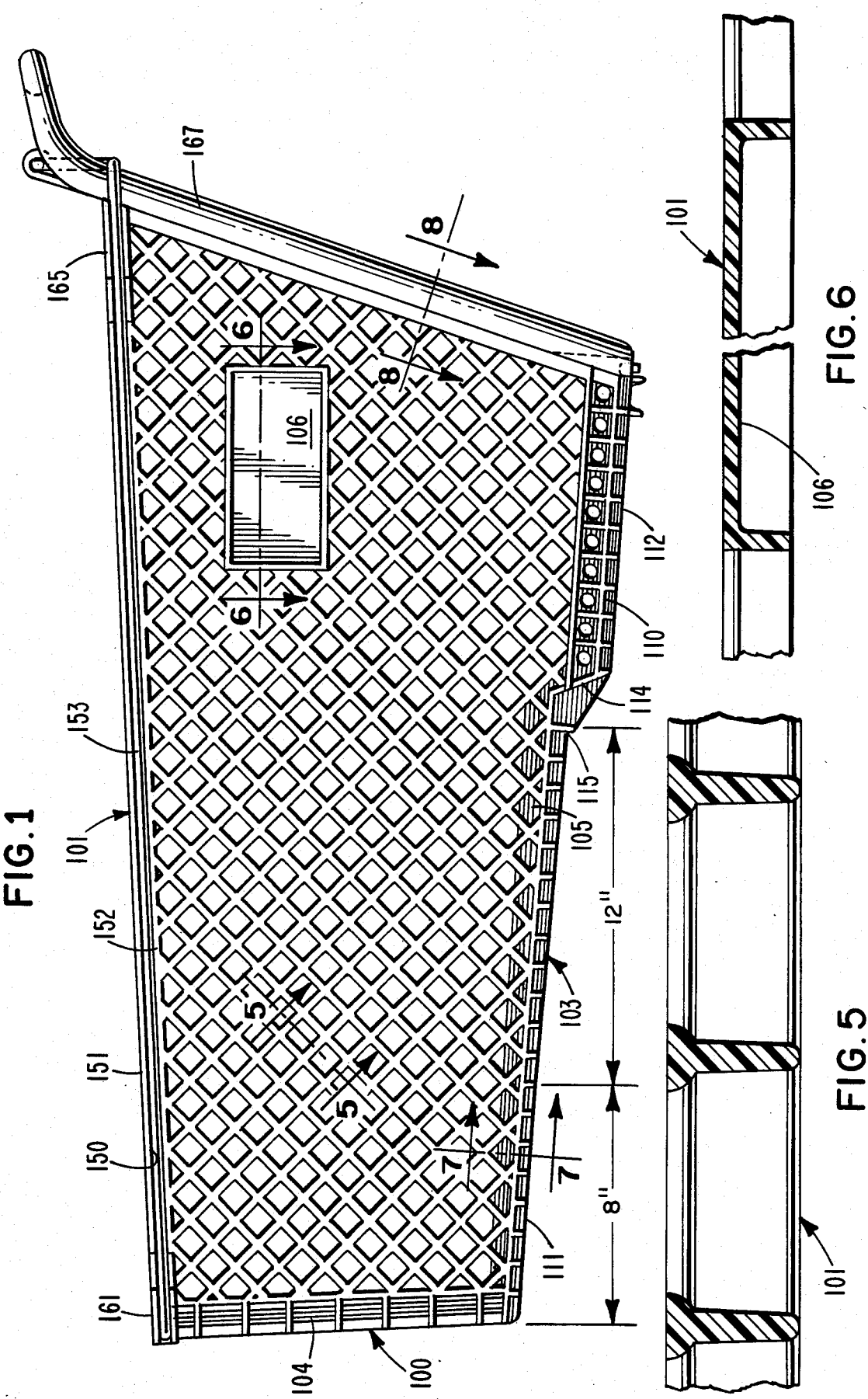

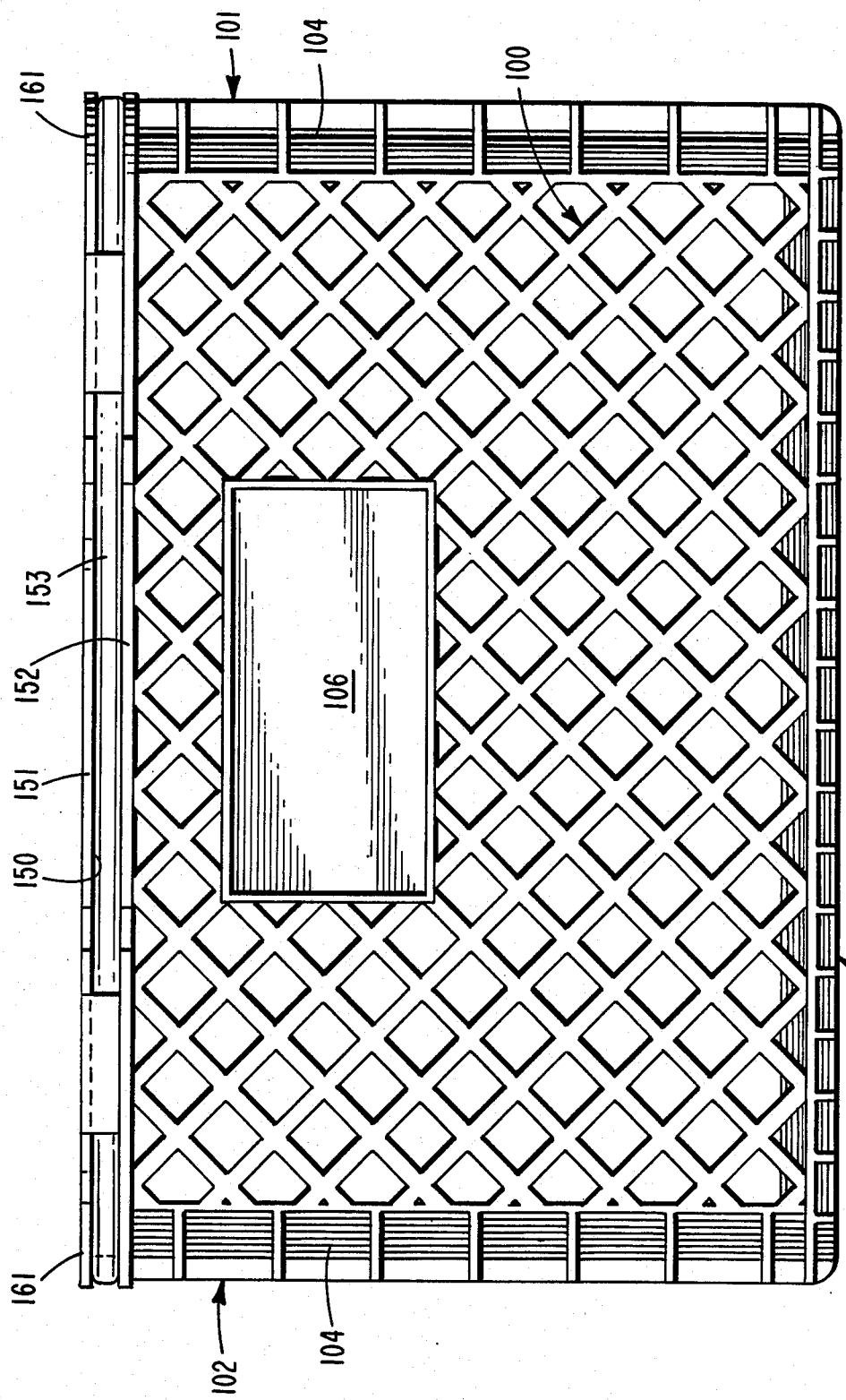

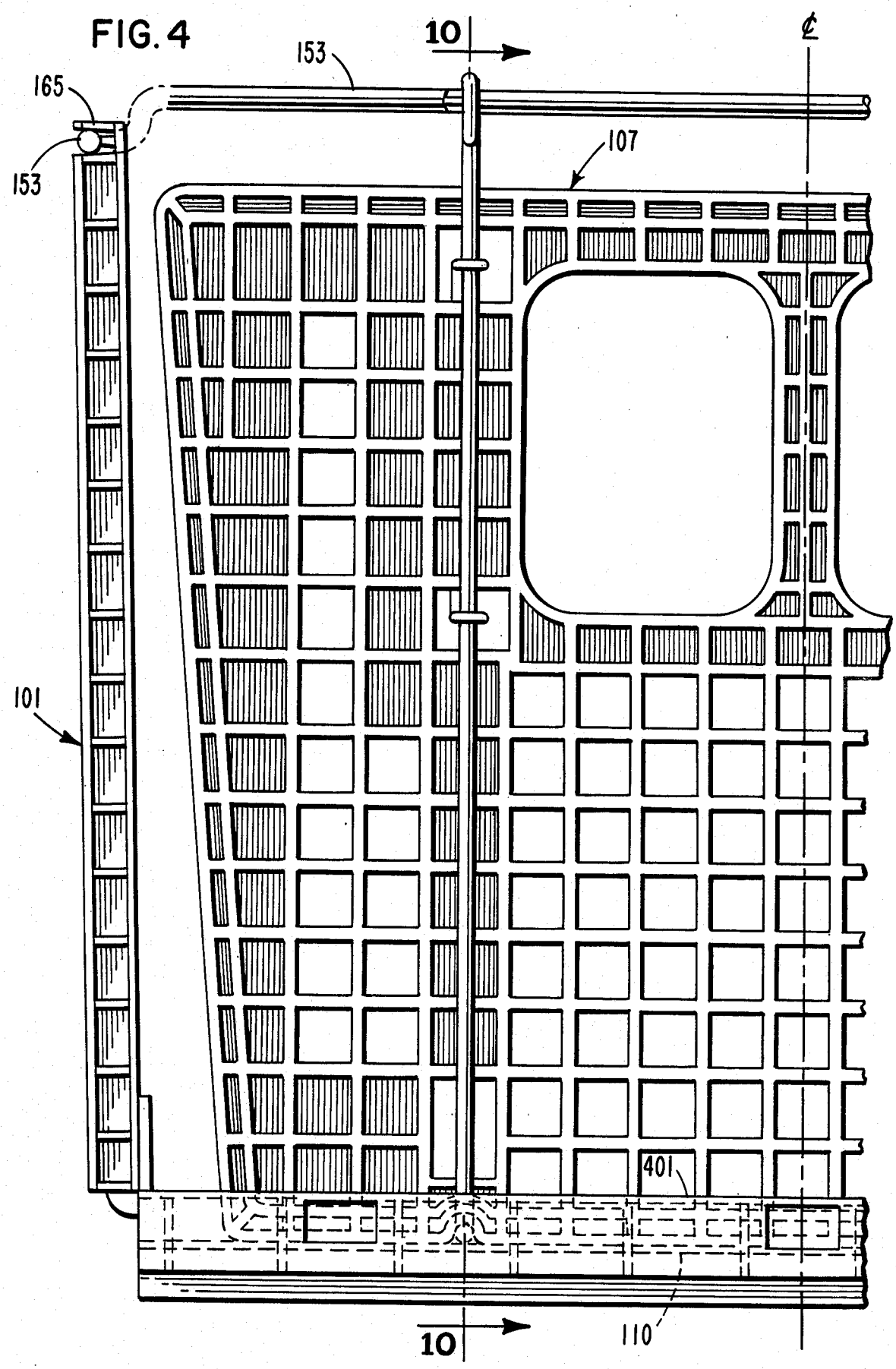

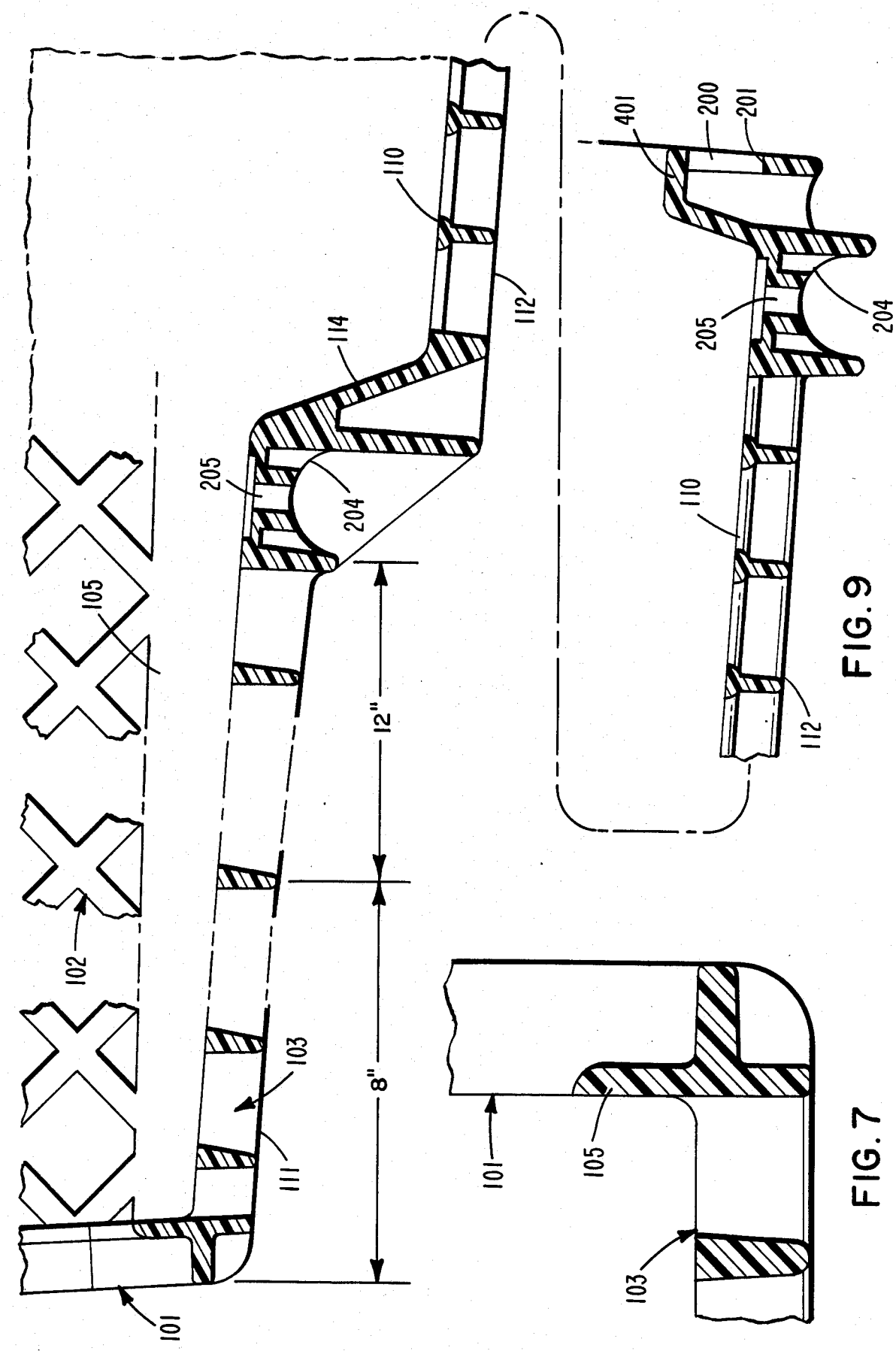

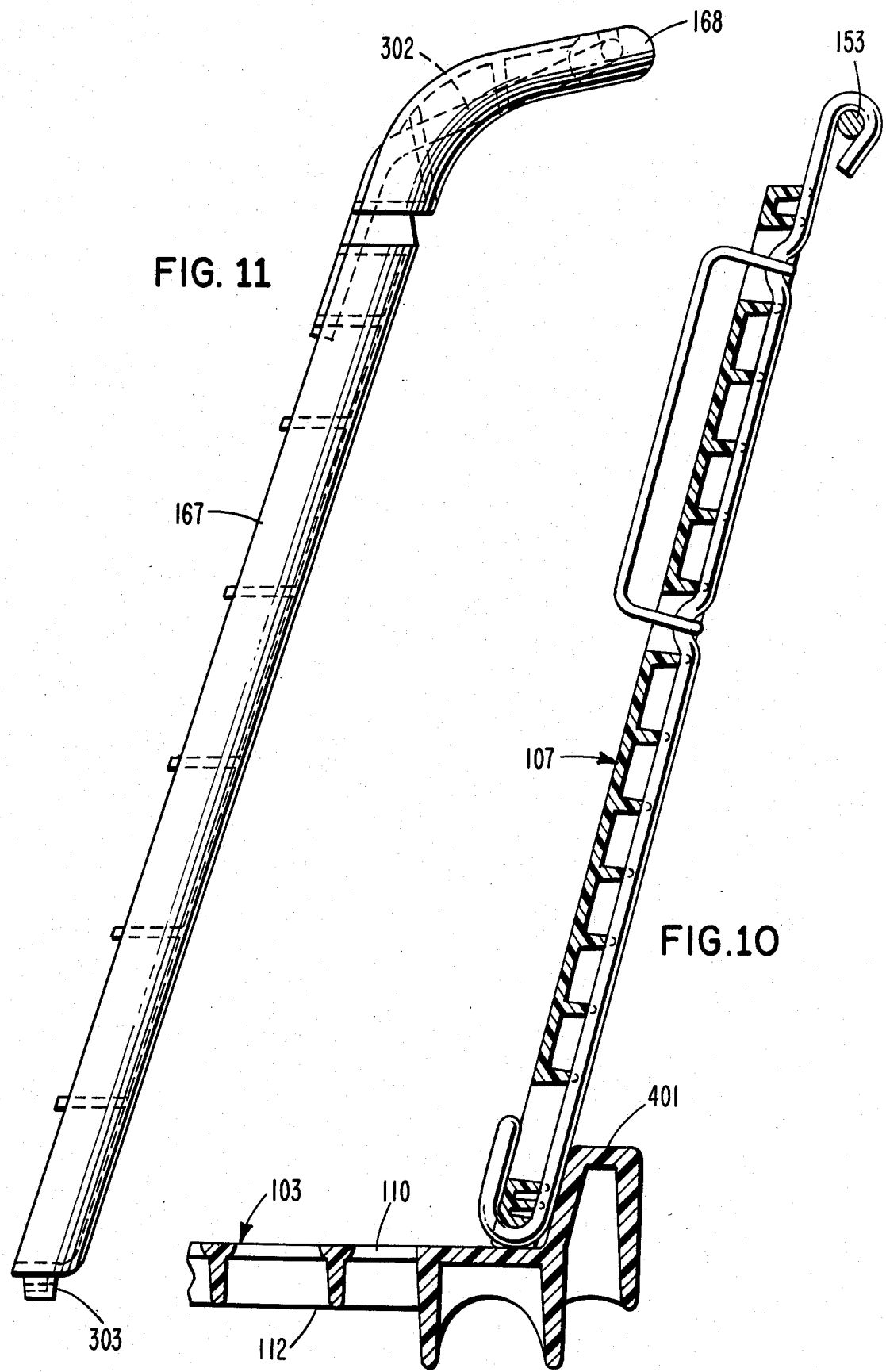

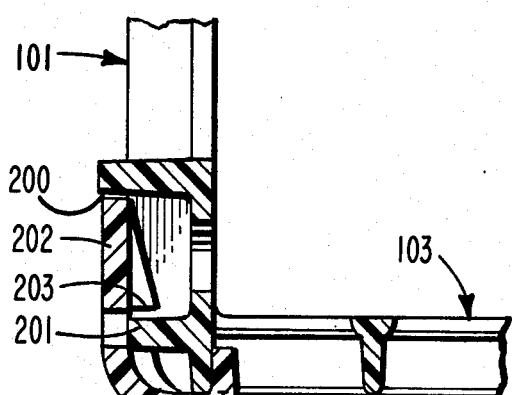
FIG. 17
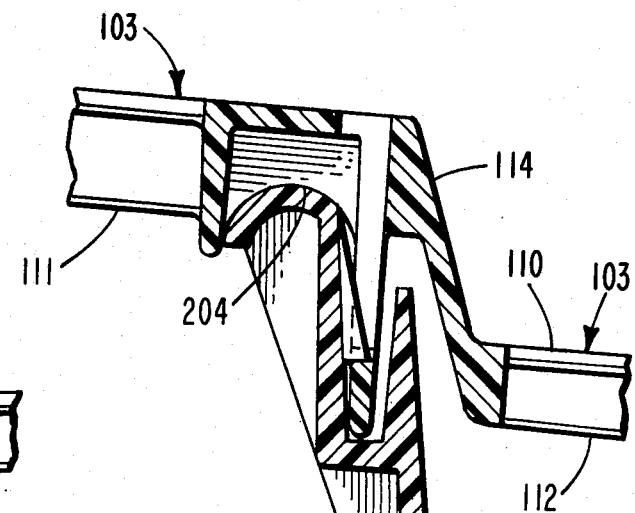
FIG. 18
FIG. 19
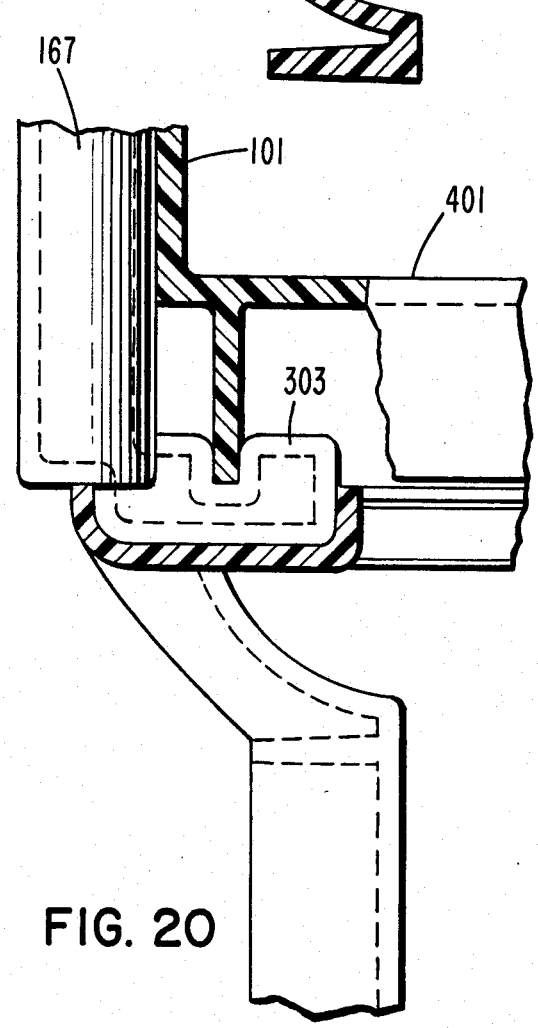
FIG. 20

BOTTOM-SUPPORTED BASKET

BACKGROUND OF THE INVENTION

The present invention relates generally to the field of wheeled carts such as to those used as grocery shopping carts in supermarkets and the like, and more particularly, is directed to a new and improved bottom-supported basket having coupling means for quickly and releasably coupling the basket to a frame or chassis.

Ideally, carts of this type, and particularly those used in supermarkets and grocery stores, should have the following characteristics. First, they should be able to withstand a great deal of abuse, particularly to the basket portion. Carts are continuously impacted with one another and with stationary objects. Second, the carts should be easy to push and to maneuver. The condition of the wheels has a great effect on this characteristic, but so does the weight of the cart. Third, the carts should be of such design and such surface finish as not to have a propensity to collect dirt and contaminants. Fourth, the carts should be able to withstand cleaning by strong detergents or steam. Fifth, the carts usually must have sides of openwork construction, because customers wish to be able to observe the contents of the carts from any angle. Sixth, the carts should be attractive and should maintain their attractiveness over a long period of time.

For the most part, the carts present in the prior art comprise a tubular metal frame to which is attached a basket of open wire-work construction. The wires are in various crossing patterns, and they are usually welded together at the crossing points. Heavier wire reinforcement is used where necessary. Conventionally, the cart frame and the basket are integral with one another. That is, the basket wires and the frame components are welded together at appropriate points, or the wires are interlocked with the frame components. To promote cleanliness and attractiveness, the entire cart is chrome plated. Sometimes plastic or rubber bumpers are installed at strategic points, such as corners.

The prior art carts do not satisfy all of the requirements set forth above. The deficiencies have chiefly to do with the basket portion. The wires in the basket are welded at the crossing points, and the basket is then chrome-plated, the latter to provide a smooth, cleanable, attractive surface. The welding process for such an item is intricate, as is the plating process. It is therefore not uncommon to have welds and plating of marginal quality so that, upon hard impact, or upon a series of impacts over a period of time, wire welds and the plating are broken. The plating is also subject to being removed by wear and by scraping against other objects. This allows the base metal to rust. Also, if the basket is used in an environment where corrosion of metals is a problem, such as in grocery stores, the base metal exposed at the broken welds will corrode. The cart, and particularly the basket, then becomes unsightly and unattractive. At those same exposed points, food particles can become entrapped in small cracks and crevices, even if the baskets are periodically cleaned, resulting in an unsanitary condition. In addition, articles placed in the basket can become pinched or snared by the unsecured wires and plating, causing inconvenience for the customer and inflicting damage to the goods. Impacts also frequently cause the basket to be deformed inwardly, giving rise to all of the above problems.

Repair of cart baskets is a problem in itself, because it is difficult to bend the wires back into shape, and it is difficult and expensive to reweld and replate them. The cart frame and the basket are often integral with one another in prior art carts, and therefore they cannot easily be taken apart to allow repair or replacement of components. To replace the basket, welds must be broken, then replaced. Or, complicated bending and interlocking of wires is necessary during disassembly and assembly. Usually, the cart is simply not repaired. When it becomes too unsightly or too unsanitary to be used, it is discarded. The loss of the entire cart for the sake of the basket is certainly uneconomical.

While prior art plastic baskets as disclosed in Applicant's U.S. Pat. No. 3,999,774 permits a more easy replacement of the basket than possible with baskets of wire construction known in the prior art, an effect is still required to uncouple the reinforcing wires from the upstanding posts of the frame. Moreover, prior art plastic basket designs do not optimize storage capacity and grocery store shopper convenience while still permitting nesting of the baskets and maintaining an aesthetically pleasing design.

Prior art carts are also quite heavy, making them difficult to push and to maneuver, especially if they have some malfunction of the wheels.

The prior art carts, when in prime condition, meet some of the above requirements. However, they deteriorate rather quickly, and soon become unsatisfactory in a number of these areas.

SUMMARY OF THE INVENTION

It is the overall object of the present invention to provide a new and improved basket for use with a wheeled cart frame which overcomes the disadvantages of prior art baskets.

A specific object of the present invention is to provide a new and improved basket which is not easily damaged by impact.

Another specific object of the present invention is to provide a new and improved basket which is easy to clean.

Another specific object of the present invention is to provide a new and improved basket which can be quickly and releasably mounted to a cart frame.

A further specific object of the present invention is to provide a new and improved basket which is lighter in weight than baskets known in the prior art.

A still further specific object of the present invention is to provide a new and improved basket which can be nested and unnested.

Another specific object of the present invention is to provide a new and improved basket which when mounted to a cart frame provides a cart which is less noisy than carts known in the prior art.

Another specific object of the present invention is to provide a new and improved basket which is more attractive than prior art baskets, and which maintains this attractiveness over a long period of time.

A still further specific object of the present invention is to provide a new and improved basket which may be mounted on a plastic chassis or may be mounted on a conventional metal frame chassis.

Another specific object of the present invention is to provide a new and improved basket which can be quickly and releasably coupled to a cart frame.

A still further specific object of the present invention is to provide a new and improved basket which a has a rear panel retaining means which positively prevents the rear panel from pivoting outwardly from the rear edge of the sidewalls of the basket to prevent injury to a child sitting in a child seat attached to the rear panel.

Another specific object of the present invention is to provide a new and improved basket which is more practical to use as a shopping cart when attached to a cart frame.

Another specific object of the present invention is to provide a new and improved basket which has a downwardly stepped rear portion which permits the basket to have a larger holding capacity.

A still further specific object of the present invention is to provide a new and improved basket which has a novel coupling means which permits quick coupling and decoupling of the basket to a frame or chassis.

Another specific object of the present invention is to provide a new and improved basket design and handle assembly which can be easily decoupled from each other without the need for removing reinforcing wires from the basket or handle assembly.

The basket in accordance with the present invention is made of plastic, such as polyethylene, which is strong, light-weight, has a smooth finish, and can deform somewhat to absorb impact and then return to its original shape. The sides, front and bottom of the plstic basket are integrally molded in one piece. Thus there are no seams to break, or cracks and crevices to collect dirt. The plastic does not rust or corrode under the influence of food acids and the like. The use of a plastic basket has been found to reduce the weight of an average cart by at least fifteen pounds.

The basket is almost entirely of open lattice construction, which further lightens it, and which allows the contents of the basket to be viewed from any angle. Rigidity is provided to the basket by the use of suitable integral strengthening ribs, and also by a novel interrelationship between the basket and the cart frame. The rearmost edges of each side panel of the basket are contoured in cross-section to mate with the configuration of the upstanding handle posts which support the handle. This provides vertical stiffness to the basket structure, without the inclusion of additional members.

The basket is designed, however, to also receive metal ring means that extend around the basket and engage the handle posts. The ring means press the rear edges of the basket sides against the posts. This also adds rigidity to the basket. The ring means preferably comprises an endless ring that encircles the basket and the handle posts.

One of the key features of this invention is the fact that the basket can be replaced, if necessary, and further, that it can be replaced quite easily. The bottom panel of the basket includes coupling means for quickly and releasably coupling the basket to a cart frame having corresponding coupling means. The coupling means includes mating male and female locking elements respectively located on the frame and basket which permit the basket to be quickly coupled to the frame. Thus, damage to the basket does not require that the entire cart be discarded. A damaged basket may be quickly removed and a new basket installed on the cart frame. The bottom panel of the basket also includes conventional mounting elements which may be used to couple the basket to a conventional metal cart frame with bolts, rivets and the like.

Another feature of the basket is that it has a downwardly stepped rear portion which permits the basket to have a large holding capacity while permitting nesting and customer convenience in removing articles from the basket.

A further important feature of the basket in accordance with the present invention is the presence of retaining means which positively prevent the rear panel from pivoting outwardly from the rear edge of the side walls of the basket. The rear edge of the bottom panel of the basket is provided with a raised transverse cross member which extends along the full width of the rear edge of the bottom panel to retain the rear panel. Thus, the rear panel is prevented from inadvertently pivoting rearwardly from beyond the rear edge of the bottom panel. The upper edge of the cross member coincides with the plane of the front portion of the bottom panel to permit nesting.

Another advantage is that the plastic basket can be made in a variety of bright colors. This makes the cart more attractive. It also makes the cart more visible, which reduces accidents both inside the store and outside on the parking lot.

A further advantage of the basket in accordance with the invention is the addition of a removable reinforced plastic handle which is releasably anchored between the upper edges of the frame mounting portion and the lower edge of the basket mounting portion. Thus, a damaged basket can be removed and a new basket and handle assembly can be replaced on an existing frame without the need to remove any reinforcing wires around the basket.

The noise produced by movement of carts which have the basket of the invention or, by impacting it with other carts or other objects, is considerably less than with carts having baskets known in the prior art.

BRIEF DESCRIPTION OF THE DRAWINGS

FIG. 1 is a side elevationl view of the basket with the plastic handle attached.

FIG. 3 is a front elevational view of the basket.

FIG. 4 is a rear elevational view fo the basket with the handle omitted.

FIG. 5 is a section view taken along line 5—5 of FIG. 1.

FIG. 6 is a sectional view taken along line 6—6 of FIG. 1.

FIG. 7 is a sectional view taken along line 7—7 of FIG. 1.

FIG. 9 is a sectional view taken along line 9—9 of FIG. 2.

FIG. 10 is a sectional view taken along line 10—10 of FIG. 4.

FIG. 11 is a side elevational view of the plastic handle.

FIG. 17 is a sectional view taken along line 17—17 of FIG. 16, after interlocking with a chassis, showing the interlocking of the side elements of the basket and chassis.

FIG. 18 is a sectional view of the assembled basket and chassis taken along line 18—18 of FIG. 2.

FIG. 19 is a sectional view of the assembled basket and chassis showing the interlocking elements at the rear of the assembly.

FIG. 20 is a fragmentary rear elevational view of the assembly, partially in section, showing the lower end of the handle clamped between the chassis and basket.

The basket in accordance with the present invention is comprised of a number of interrelated elements. Each of which will be a explained in detail below. Basically, the basket comprises a front panel, two side panels and a bottom panel integrally molded with one another. A rear panel is positioned between the two side panels in opposed relationship to the front panel and is pivotable between the two side panels to permit nesting of a plurality of baskets. A retaining rail is integrally molded along the rear edge of the bottom panel to prevent the rear panel from pivoting rearwardly from beyond the rear edge of the bottom panel. An important feature of the basket in accordance with the present invention is the presence of a basket bottom portion having a quick release coupling means engageable with a corresponding mounting portion on a chassis. The quick release coupling means permits the basket to be readily attached to or release from a corresponding chassis.

The basket is advantegously manufactured of a plastic material such as polyethylene. The properties of polyethylene are ideally suited to this application, for polyethylene is relatively strong, but panels manufactured of it are flexible enough to absorb some deformation, such as caused by impact, without breaking. However, other materials having similar properties can also be used.

In order to facilitate the cleaning of the basket, and to allow the user to observe the goods placed in the basket, the basket is of open lattice work construction. The lattice can be any one of a multitude of patterns. As shown herein, the patter is in squares.

Figure 1A:
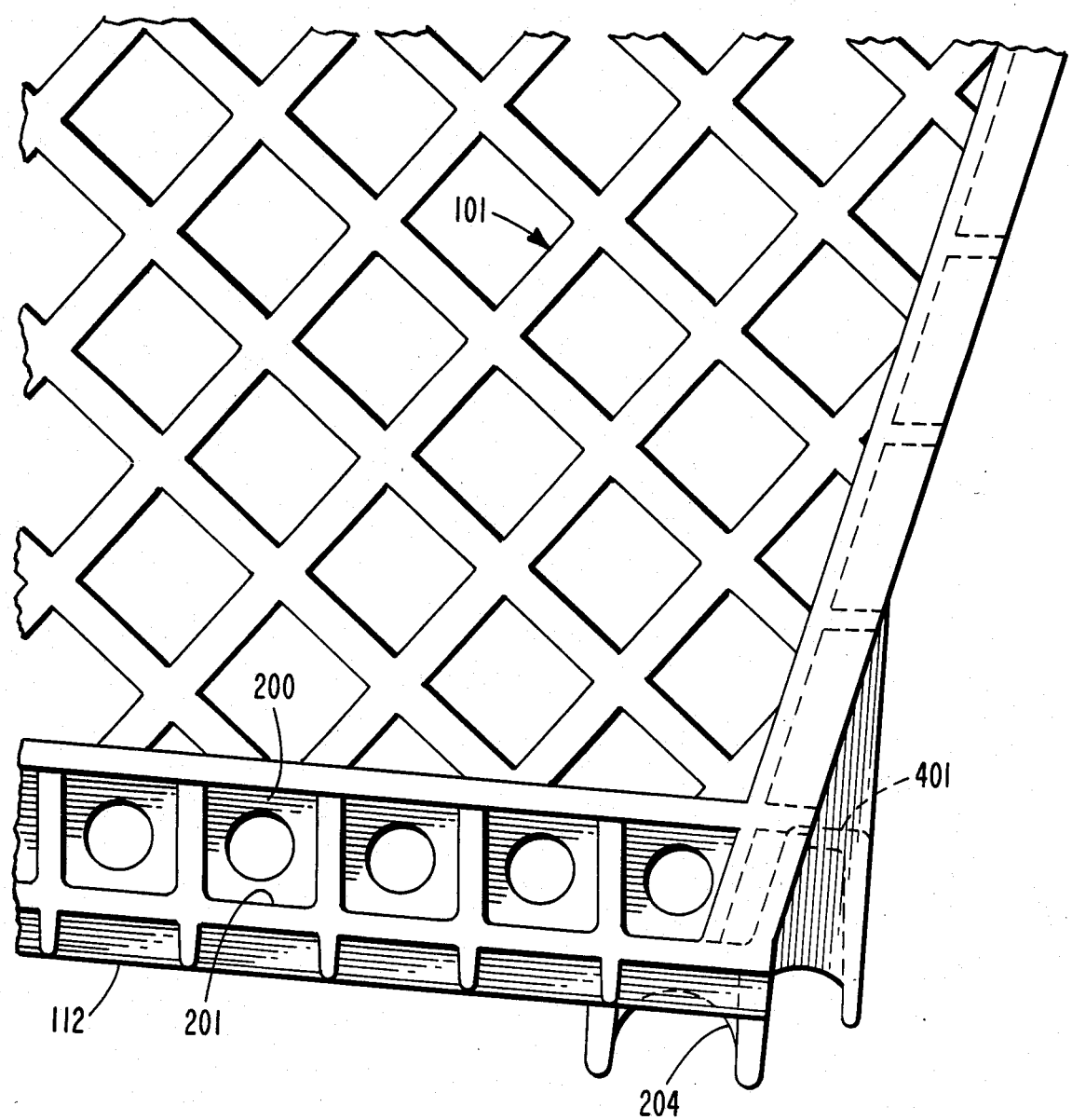
FIG. 1A is a side elevational view of the basket showing the rear panel retaining member.

As shown in FIG. 1, the basket in accordance with the present invention comprises a front panel 100 and side panels 101 and 102. At the corners, the lattice work is an overlay upon solid corner portions 104, which give rigidity and strength at key points. Bottom panel 103 is integrally attached to panels 100, 101 and 102. It is also of open lattice construction, except for certain solid portions. Additional solid portions 105 are also present to add strength to the side panels, and a solid portion 106 can be added for the purpose of carrying a label or advertising.

Figure 2:
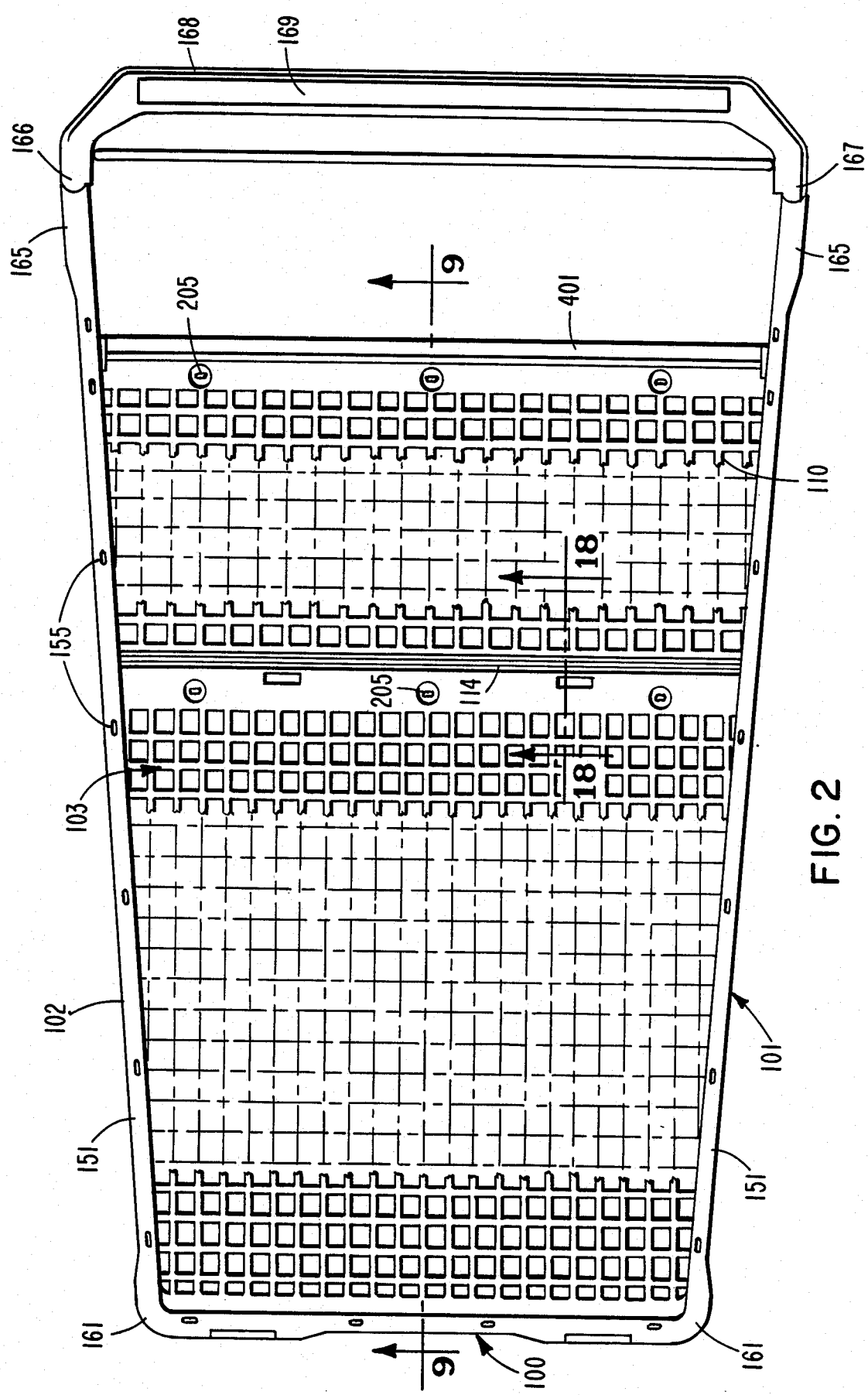
FIG. 2 is a top plane view of the basket assembly shown in FIG. 1.
Figure 12:
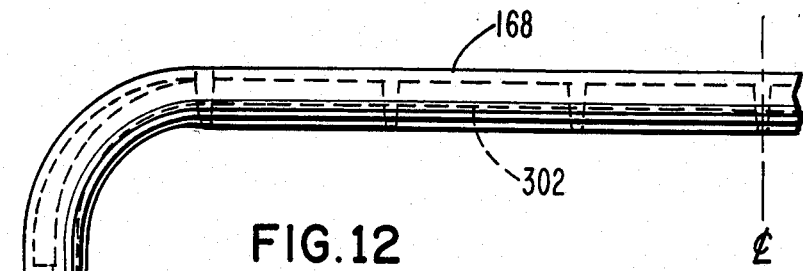
FIG. 12 is a rear elevational view of the handle.
Figure 14:
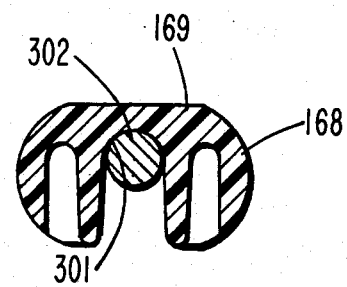
FIG. 14 is a sectional view taken along line 14—14 of FIG. 13.
Figure 15:
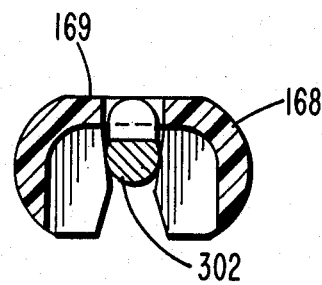
FIG. 15 is a sectional view taken along line 15—15 of FIG. 13.
Figure 8:
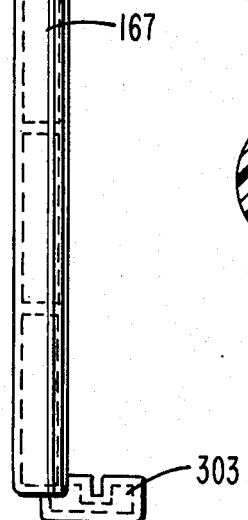
FIG. 8 is a sectional view taken along line 8—8 of FIG. 1.
Figure 13:
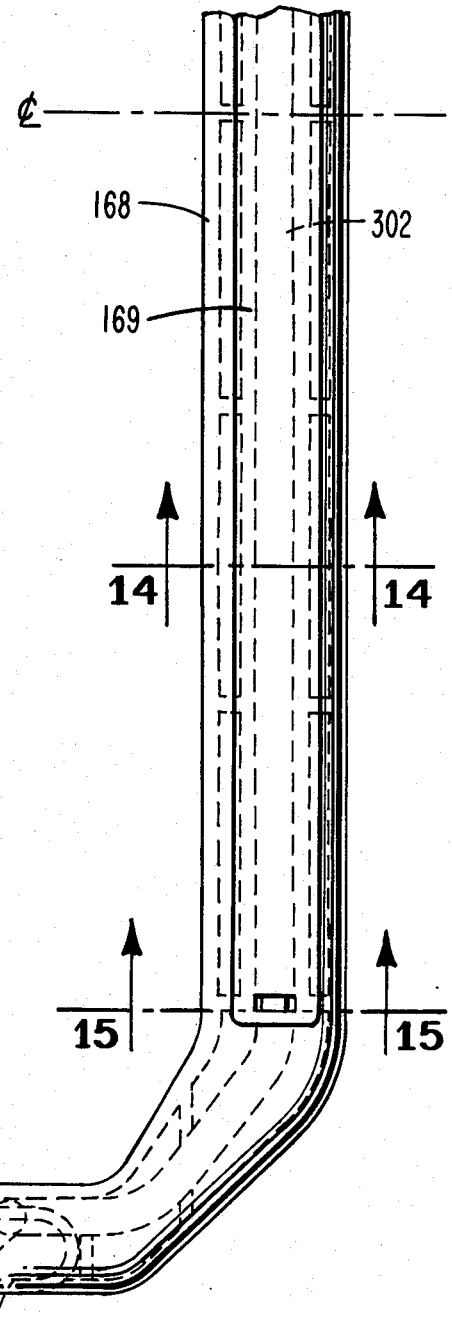
FIG. 13 is a top plane view of the handle.

As shown in FIG. 2, Side panels 101 and 102 include at each of their rear edges widened sections 165, and at their forward corners widened sections 161. The function of these widened portions is to act as bumpers against adjacent objects. Widened sections 165 of the rear edges of side panels 101 and 102 terminate in a portion which is concavely curved to engage handle posts 166, 167. This adds rigidity to the plastic basket and prevents the basket from moving laterally with respect to the chassis. Other conforming configurations might also be used, however.

It is very important to have a strong basket, one that will withstand impact and high loading. Therefore, the basket may be provided with reinforcement. With reference again to FIG. 1 and FIG. 2, channel 150 extends around the top edge of the basket, defined by a pair of horizontally extending shoulders 151 and 152. An endless metal reinforcing ring 153 encircles the upper portion of the basket. Ring 153 is received in channel 150 which surrounds the top periphery of side panels 101 and 102 and front panel 100. Shoulder 151 is provided with a plurality of upwardly extending openings 155. Tabs on ring 153 are received in these opening 155 in order to interlock the basket 102 with ring 153. This arrangement is present for practically the entire length of channel 150, as illustrated in FIG. 2. Ring 153 extends around handle posts 166 and 167 and across the rear of the basket as shown in FIG. 4. Ring 153 serves as a pivot point or hinge for rear panel 107.

One of the novel features of this invention is the fact the the plastic basket can easily be replaced if it is damaged. As mentioned in the opening paragraphs of this specification, one of the disadvantages of a wire basket is that, once broken, it is difficult and expensive to repair, if it can at all be repaired. If the plastic basket of this invention becomes damaged. it can easily be removed and replaced.

The basket in accordance with the present invention includes coupling means comprising male and female locking elements respective located on the basket and frame which permit the basket to be quickly coupled to the frame. Thus the basket can be removed from the frame and replaced easily if necessary.

The coupling means is formed on the bottom surface of bottom panel 103 and include a plurality of coupling features each of which comprise a window 200 with locking shoulder 201 as shown in FIGS. 17-19. A locking tang 202 extend upwardly from a cart frame having an upwardly facing mounting portion. Locking shoulder 201 receives locking surface 203 of locking tang 202 to securely engage the basket to the frame. A plurality of such coupling features may be located along the bottom and side surfaces of the basket to provide the requisite coupling strength.

Figure 21:
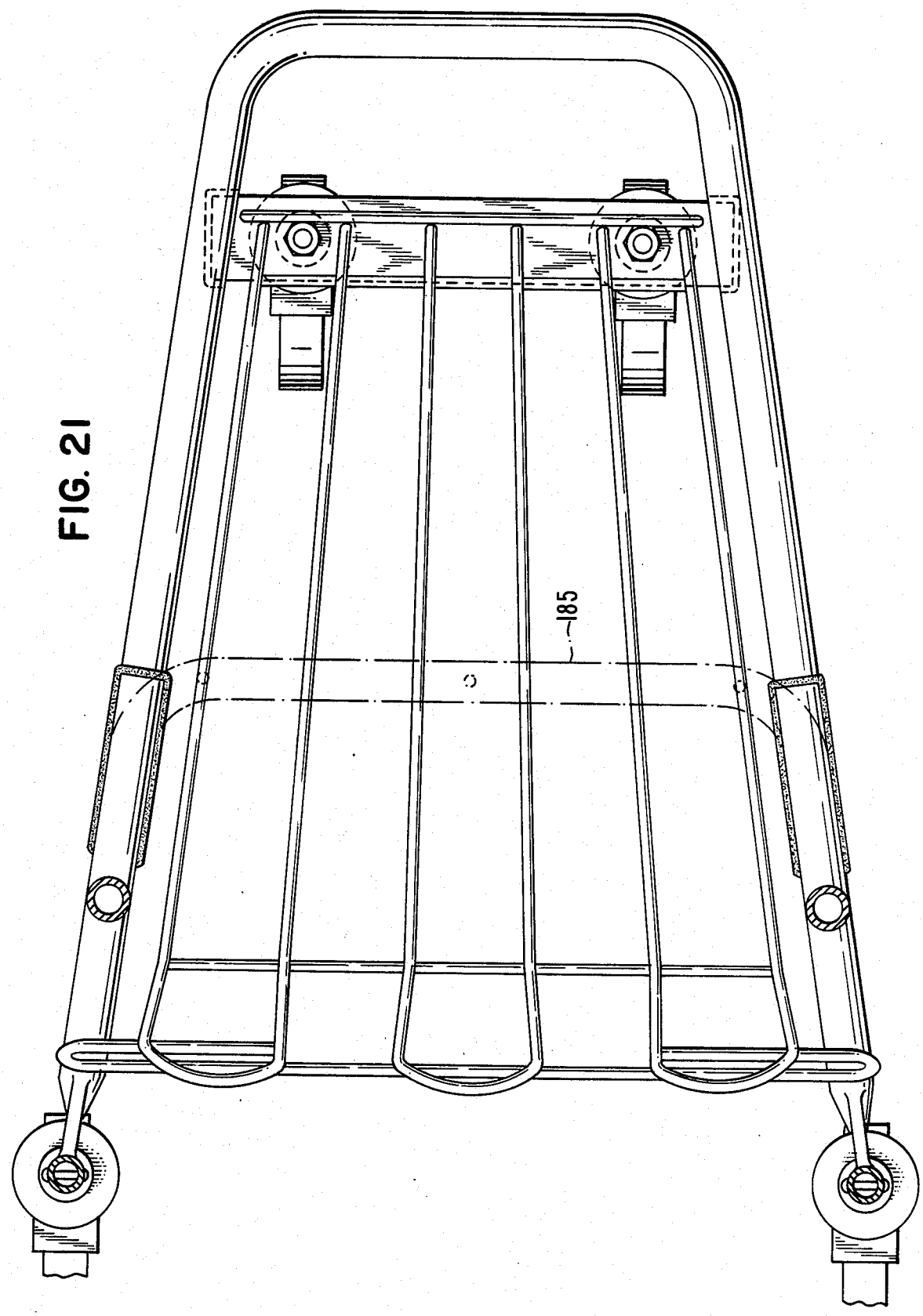
FIG. 21 is a top view of a cart frame which may be used with the basket of the present invention.

Bottom panel 103 also includes conventional mounting elements which may be used to couple the basket to a conventional metal cart frame with bolts and rivets. Such a cart frame is disclosed in applicants U.S. Pat. No. 3,999,774, a top view of which is shown in FIG. 21 of the present drawings. As shown in FIG. 19, the basket coupling means of the invention also included a downwardly curved portion 204 which receives a tubular portion of a cart frame, such as tubular portion 185 shown in FIG. 21. The tubular portion is secured in portion 204 by a bolt or rivet extending through hole 205.

Another example of a conventional metal cart frame is shown in U.S. Pat. No. 3,645,554 to Von Stein et al. The cart disclosed by the Von Stein et al. patent includes a rear transverse tubular member which could mate with downwardly curved portion 204.

Figure 16:
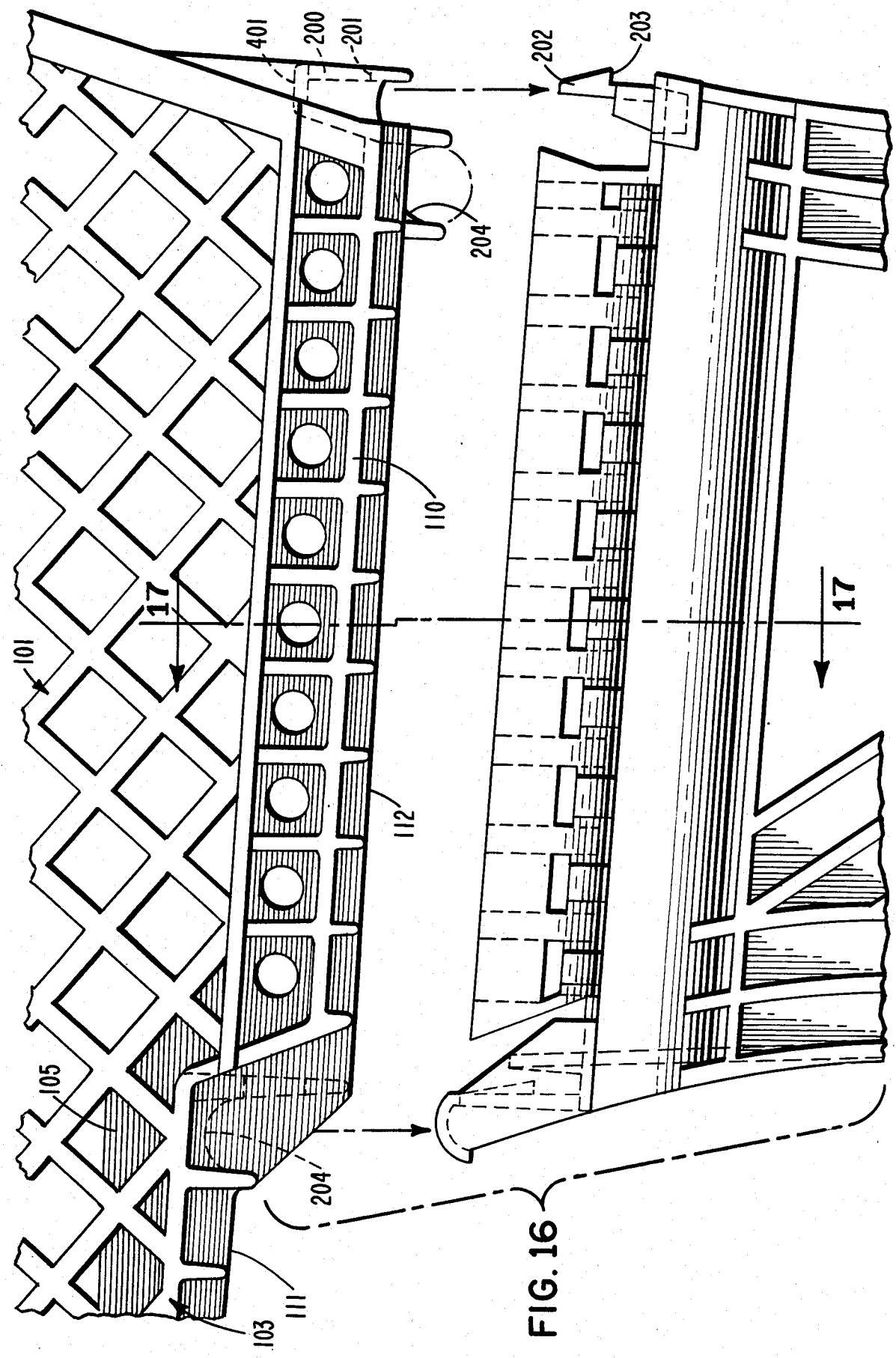
FIG. 16 is an exploded side elevational view of the basket prior to interlocking the basket to a frame or chassis.

FIG. 16 illustrates the engagement of the basket of the invention with a cart frame or chassis having a corresponding mating surface. Such a chassis is described in Applicant's U.S. patent application Ser. No. 607,128.

Handle posts 166 and 167 are shown in more detail in FIG. 11-15. Handle posts 166, 167 are connected by handle bar 168 (FIG. 2) to form a convenient way of pushing the basket when it is attached to a chassis. Handle posts 166, 167 and handle bar 168 are also of plastic construction and may be integrally molded. Handle bar 168 includes a flat surface 169 for receiving written information. Handle bar 168 and a portion of handle posts 166, 167 are formed with a recessed portion 301 which receives reinforcing rod 302 to provide additional strength for the assembly. Handle posts 166 and 167 each include a mounting feature 303 which engages bottom panel 103 of the basket and an upper facing portion of the chassis as shown in FIG. 20. Thus when the basket is coupled to the chassis, the handle posts 166 and 167 are sandwiched between the basket and chassis and held there securely.

With reference to FIGS. 9 and 10, bottom panel 103 includes at its rearward edge, a raised transverse cross member 401 of hollow cross-section extending along the full width of its rear edge. Cross member 401 is located to prevent the rear panel of the basket from pivoting rearwardly from beyond the rear edge of the bottom panel. As shown in FIG. 10, cross member 401 is substantially high with respect to rear panel 107 so that rear panel 107 does not inadvertently pass the cross member.

Rear panel 107 carries a conventional child seat as shown in applicant's above cited U.S. Pat. No. 3,999,774. Thus, it is important to positively prevent rear panel 107 from pivoting outwardly from the rear edges of side panels 101 and 102 of the basket to prevent injury to a child sitting on the child seat. The substantially high edge of cross member 401 accomplishes this purpose.

The extended high of cross member 401 is permitted because of the presence of stepped rear portion 110 of the basket. Were it not for step portion 110, the extended high of cross member 401 would prevent basket nesting. With reference to FIG. 1, the lower contour of the basket is in two planes, a first inclined plane 111 and a second inclined plane 112 connected by a step portion 114. To permit nesting of the baskets, the height of cross member 401 is maintained lower than the rear edge of inclined plane 111, i.e., point 115. Since cross member 401 is carried on plane 112, which is lower than plane 111, it can be made very high without interferring with nesting of the baskets.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:

1. A bottom-supported basket for use with a wheeled cart frame having an upwardly facing frame mounting portion, said frame mounting portion having quick release engaging means for engaging said basket, said basket comprising:
    a pair of opposed side panels;
    a front panel joined to the front edges of said side panels;
    a rear panel molded principally of open lattice construction positioned between said side panels, whereby said rear panel is in opposed relationship to said front panel and is pivotable between said side panels;
    a bottom panel joined to the bottom edges of said front and side panels, said bottom panel having a downwardly facing basket mounting portion adapted to mate with said frame mounting portion, said basket mounting portion having front and rear downwardly opening transverse seats, wherein the rear edge of said bottom panel has a raised transverse cross member of hollow cross-section extending across said rear edge, said cross member being located to prevent said rear panel from pivoting rearwardly from beyond said rear edge of said bottom panel; and
    said basket mounting portion having quick release coupling means engageable solely with said quick release engaging means of said frame mounting portion for quickly, releasably coupling said basket to said frame.

2. The basket of claim 1 wherein said bottom panel has a rear portion and a front portion, said front portion being higher than said rear portion and the top of said cross member when said basket is mounted on said frame so that a plurality of said baskets can be longitudinally nested when mounted on similar frames.

3. The basket of claim 2 wherein the height of said cross member is below the plane of the bottom front edge of said basket.

4. The basket of claim 1 wherein said cross member is integrally molded at its end to each respective said side panel.

5. A wheeled cart comprising:
    a wheeled frame having an upwardly facing frame mounting portion, said frame mounting portion having quick release engaging means for engaging said basket; and a basket having a pair of opposed side panels, a front panel joined to the front edges of said side panels, a bottom panel joined to the bottom edges of said front and side panels, a rear panel molded principally of open lattice construction positioned between said side panels, whereby said rear panel is in opposed relationship to said front panel and is pivotable between said side panels, wherein the rear edge of said bottom panel has a raised transverse cross member of hollow cross-section extending across the full width of said rear edge, said cross member being located to prevent said rear panel from pivoting rearwardly from beyond said rear edge of said bottom panel, and a downwardly facing basket mounting portion adapted to mate with said frame mounting portion, said basket mounting portion having front and rear downwardly opening transverse seats, said basket mounting portion having quick release coupling means engageable solely with said quick release engaging means of said frame mounting portion for quickly, releasably coupling said basket to said frame.

6. The wheeled cart of claim 5 wherein said cross member is integrally molded at its ends to each respective said side panel.

7. A bottom-supported basket for use with a wheeled cart frame having an upwardly facing frame mounting portion, said frame mounting portion having quick release engaging means for engaging said basket, the basket comprising:
    a pair of opposed side panels;
    a front panel joined to the front edges of said side panels;
    a bottom panel joined to the bottom edges of said front and side panels, said bottom panel having a downwardly facing basket mounting portion adapted to mate with said frame mounting portion;

a handle assembly including a pair of upstanding handle supports having lower ends which are anchored between said frame mounting portion and said basket mounting portion; and said basket mounting portion having quick release coupling means engageable solely with said quick release engaging means of said frame mounting portion for quickly, releasably coupling said basket to said frame.

8. The basket of claim 9 wherein said side panels, said front panel and said bottom panel are integrally molded with one another, and are principally of open lattice construction.

9. The basket of claim 7 wherein said handle supports are reinforced to provide additional strength.

10. The basket of claim 9 wherein said handle assembly further comprises a handle connected between said upstanding supports, said handle including a substantially flat surface for receiving written information.

11. The basket of claim 7 wherein said frame mounting portion and said basket mounting portion have respective handle locking elements located along the lower edge of said basket mounting portion and the upper edge of said frame mounting portion for anchoring said handle supports.

12. A wheeled cart comprising:
a wheeled frame having an upwardly facing frame mounting portion, said frame mounting portion having quick release engaging means for engaging said basket;
a basket having a pair of opposed side panels, a front panel joined to the front edges of said panels, a bottom panel joined to the bottom edges of said front and side panels, and a downwardly facing basket mounting portion adapted to mate with said frame mounting portion, said basket mounting portion having quick release coupling means engageable solely with said frame quick release engaging means of said frame mounting portion for coupling said basket to said frame; and
a handle assembly including a pair of upstanding handle supports having lower ends which are anchored between said frame mounting portion and said basket mounting portion, said frame mounting portion and said basket mounting portion having female and male handle locking elements respectively located along the lower edge of said basket mounting portion and the upper edge of said frame mounting portion for anchoring the lower ends of said handle supports, said handle locking element of said frame portion having a socket which receives the lower end of said handle supports, said cart further comprising an upwardly opening socket on the lower end of each of said handle supports and a depending projection on said handle locking element of the basket portion which is received in said upwardly opening handle socket.

13. A bottom-supported basket for use with a wheeled cart frame having an upwardly facing frame mounting portion, said frame mounting portion having quick release engaging means for engaging said basket, the basket comprising:
a pair of opposed side panels;
a front panel joined to the front edges of said side panels;
a bottom panel joined to the bottom edges of said front and side panels, said bottom panel having a downwardly facing basket mounting portion adapted to mate with said frame mounting portion, said basket mounting portion having quick release coupling means engageable solely with said quick release engaging means of said frame mounting portion for quickly, releasably coupling said basket to said frame; and
a handle assembly including a pair of upstanding handle supports having lower ends which are anchored between said frame mounting portion and said basket mounting portion, said frame mounting portion and said basket mounting portion having mating female and male handle locking elements respectively located along the lower edge of said basket mounting portion and the upper edge of said frame mounting portion for anchoring said handle suppports, said handle locking element of said frame portion having a socket which receives the lower end of said handle supports, said cart further comprising an upwardly opening socket on the lower end of each of said handle supports and a depending projection on the handle locking element of said basket portion which is received in said upwardly opening handle socket.

14. A bottom-supported basket for use with a wheeled cart frame having an upwardly facing frame mounting portion, said frame mounting portion having quick release engaging means for engaging said basket, the basket comprising:
a pair of opposed side panels;
a front panel joined to the front edges of said side panels;
a bottom panel joined to the bottom edges of said front and side panels, said bottom panel having a downwardly facing basket mounting portion adapted to mate with said quick release engaging means of said frame mounting portion;
a rear panel positioned between said side panels, said rear panel being in opposed relationship to said front panel and being pivotably mounted between said side panels; and
the rear portion of said bottom panel being downwardly stepped with respect to the front portion of said bottom panel and said front portion being slanted down rearwardly toward said rear portion, said raised transverse crossmember having a height substantially in line with the plane defined by said front portion.

15. A bottom-supported basket for use with a wheeled cart frame having an upwardly facing frame mounting portion, said frame mounting portion having quick release engaging means, the basket comprising:
a pair of opposed side panels;
a front panel joined to the front edges of said side panels;
a bottom panel joined to the bottom edges of said front and side panels, said bottom panel having a downwardly facing basket mounting portion adapted to mate with said quick release engaging means of said frame mounting portion;
a rear panel positioned between said side panels, whereby said rear panel is in opposed relationship to said front panel and is pivotable between said side panels;
the rear edge of said bottom panel having a raised transverse crossmember extending across the full width of said rear edge, said cross member being located to prevent said rear panel from pivoting rearwardly from beyond said rear edge of said bottom panel; and the bottom contour of said basket having first and second planes slanted down rearwardly and connected by a step portion, said second plane being below said first plane wherein the height of said raised cross-member is lower substantially in line with said first plane.

16. A bottom-supported basket for use with a wheeled cart frame having an upwardly facing frame mounting portion, the basket comprising:

a pair of opposed side panels;

a front panel joined to the front edges of said side panels;

a bottom panel joined to the bottom edges of said front and side panels, said bottom panel having a downwardly facing basket mounting portion adapted to mate with said frame mounting portion;

the rear edge of said bottom panel having a raised transverse crossmember;

a rear panel positioned between said side panels, said rear panel being in opposed relationship to said front panel and is pivotably mounted between said side panels;

the rear portion of said bottom panel being downwardly stepped with respect to the front portion of said bottom panel and said front portion being slanted down rearwardly toward said rear portion, said raised transverse crossmember having a height substantially coinciding with the plane defined by said front portion.

17. The basket of claim 16 wherein said side panels, said front panel and said bottom panel are integrally molded with one another, and are principally of open lattice construction.

18. The basket of claim 16 further comprising a pair of spaced, parallel shoulders extending along said side panels and said front panels adjacent their top edge to define a channel for receiving a reinforcing means for reinforcing said basket.

19. The basket of claim 18 further comprising a plurality of openings in one of said shoulders to receive locking tabs carried by said reinforcing means to secure said reinforcing means within said channel.

20. The basket of claim 18 further comprising a plurality of retaining means positioned along said channel, and covering a portion of said channel for retaining said reinforcing means within said channel.

21. A bottom-supported basket for use with a wheeled cart frame having an upwardly facing frame mounting portion, the basket comprising:

a pair of opposed side panels;

a front panel joined to the front edges of said side panels;

a bottom panel joined to the bottom edges of said front and side panels, said bottom panel having a downwardly facing basket mounting portion adapted to mate with said frame mounting portion;

a rear panel positioned between said side panels, whereby said rear panel is in opposed relationship to said front panel and is pivotable between said panels;

the rear edge of said bottom panel having a raised transverse cross-member extending across at least a portion of the width of said rear edge, said cross-member being located to prevent said rear panel from pivoting rearwardly from beyond said rear edge of said bottom panel; and the bottom basket of said basket having first and second planes slanted down rearwardly and connected by a step portion, said second plane being below said first plane wherein the height of said raised cross-member is substantially in line with said first plane.

* * * * *